(12) United States Patent
Masud et al.

(10) Patent No.: US 12,411,669 B2
(45) Date of Patent: Sep. 9, 2025

(54) PACKAGE GENERATION FOR CONFIGURING A WORKING ENVIRONMENT ON A SERVER INSTANCE

(71) Applicant: Salesforce, Inc., San Francisco, CA (US)

(72) Inventors: Radif Masud, Chicago, IL (US); Stewart Anderson, Edinburgh (GB)

(73) Assignee: Salesforce, Inc., San Francisco, CA (US)

( * ) Notice: Subject to any disclaimer, the term of this patent is extended or adjusted under 35 U.S.C. 154(b) by 245 days.

(21) Appl. No.: 18/099,382

(22) Filed: Jan. 20, 2023

(65) Prior Publication Data

US 2024/0248688 A1    Jul. 25, 2024

(51) Int. Cl.
    *G06F 8/41* (2018.01)
    *G06F 8/30* (2018.01)

(52) U.S. Cl.
    CPC . *G06F 8/41* (2013.01); *G06F 8/31* (2013.01)

(58) Field of Classification Search
    CPC .................................... G06F 8/31; G06F 8/41
    USPC ........................................................ 717/140
    See application file for complete search history.

(56) References Cited

U.S. PATENT DOCUMENTS

| | | | |
|---|---|---|---|
| 9,021,420 B2 * | 4/2015 | Jacquin | G06Q 10/06 717/106 |
| 9,047,407 B2 * | 6/2015 | Jazdzewski | G06F 11/3636 |
| 9,582,261 B2 * | 2/2017 | Singh | G06F 3/04847 |
| 9,965,261 B2 * | 5/2018 | Chen | G06F 8/60 |
| 10,740,090 B2 * | 8/2020 | Price | G06F 8/65 |
| 11,068,242 B2 * | 7/2021 | Perez Alvarez | H04L 67/1097 |
| 11,093,227 B1 * | 8/2021 | Shteyman | H04L 67/34 |
| 11,157,253 B1 * | 10/2021 | Shteyman | G06F 8/71 |
| 11,409,507 B1 * | 8/2022 | Shepherd | G06F 8/75 |
| 11,675,620 B2 * | 6/2023 | Dobrev | G06F 9/5038 718/102 |
| 12,022,805 B2 * | 7/2024 | Spears | G06T 7/11 |

(Continued)

FOREIGN PATENT DOCUMENTS

CN    118132133 A  *  6/2024
WO    WO-2019143412 A1  *  7/2019

OTHER PUBLICATIONS

Hinkel, Georg, et al. "Using internal domain-specific languages to inherit tool support and modularity for model transformations." Software & Systems Modeling 18 (2019): 129-155.*

(Continued)

*Primary Examiner* — Francisco J Aponte
(74) *Attorney, Agent, or Firm* — Butzel Long

(57) ABSTRACT

Systems, devices, and techniques are disclosed for package generation for configuring a working environment on a server instance. Code written using a Domain Specific Language (DSL) for package generation may be received. A first component specified in the code written using the DSL may be determined. A second component based on a hard reference in code of the first component may be determined. A third component may be determined based on soft reference in source code of the first component or the second component. A package including the first component, the second component, and the third component may be generated. The package may be deployed on a server instance of a cloud computing server system.

20 Claims, 12 Drawing Sheets

(56) References Cited

U.S. PATENT DOCUMENTS

| | | | |
|---|---|---|---|
| 12,086,651 B2* | 9/2024 | Gallegos | G06F 3/067 |
| 12,141,166 B2* | 11/2024 | Modi | G06F 16/275 |
| 12,141,559 B2* | 11/2024 | Zhao | G06F 8/433 |
| 2016/0321067 A1* | 11/2016 | Harrison | G06F 11/3604 |
| 2018/0039921 A1* | 2/2018 | Mos | G06Q 10/103 |
| 2018/0165122 A1* | 6/2018 | Dobrev | G06F 8/60 |
| 2018/0349778 A1* | 12/2018 | Pèrez Àlvarez | G06F 16/212 |
| 2020/0004598 A1* | 1/2020 | Brebner | G06F 9/5055 |
| 2020/0007615 A1* | 1/2020 | Brebner | G06F 9/542 |
| 2020/0057625 A1* | 2/2020 | Livne | G06F 8/65 |
| 2020/0218519 A1* | 7/2020 | Brebner | G06F 8/60 |
| 2021/0382709 A1* | 12/2021 | Sagal | G06F 8/71 |
| 2023/0048653 A1* | 2/2023 | Tripathi | G06F 8/60 |
| 2023/0244466 A1* | 8/2023 | Shah | G06F 8/63 |
| | | | 717/178 |
| 2023/0393832 A1* | 12/2023 | Touati | H04L 67/10 |
| 2024/0203043 A1* | 6/2024 | Brebner | G01S 5/02521 |

OTHER PUBLICATIONS

Voelter, Markus, et al. "Using language workbenches and domain-specific languages for safety-critical software development." Software & Systems Modeling 18.4 (2019): 2507-2530.*

* cited by examiner

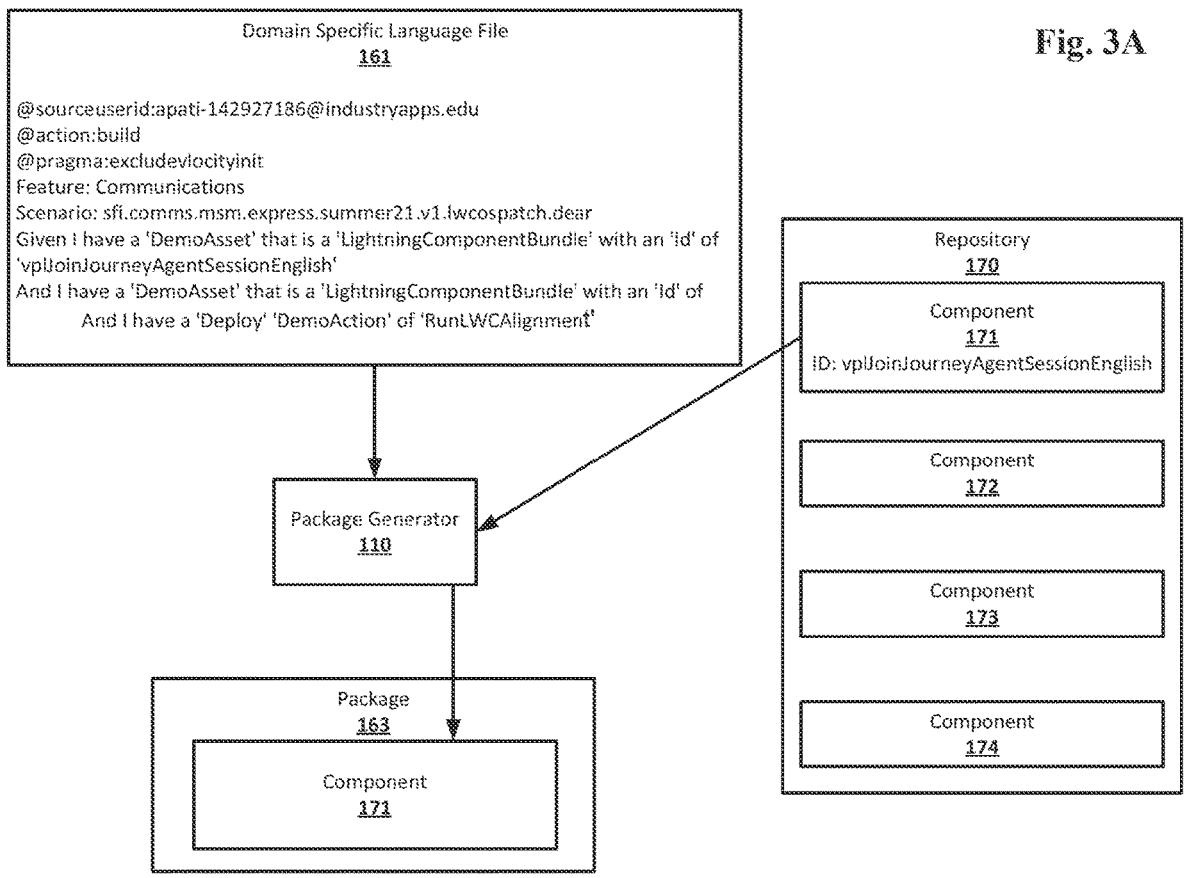

PACKAGE GENERATION FOR CONFIGURING A WORKING ENVIRONMENT ON A SERVER INSTANCE

BACKGROUND

A server system may host multiple working environments. The working environments may make use of resources, such as database and search components, that are part of the server system, but may also have their own separate components, including their own data and metadata. Setting up a new working environment on such a server system may be difficult and time consuming, requiring knowledge of component dependencies and the order in which components need to be deployed on the server system.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 3A shows an example arrangement suitable for package generation for configuring a working environment on a server instance according to an implementation of the disclosed subject matter.

DETAILED DESCRIPTION

Figure 1:
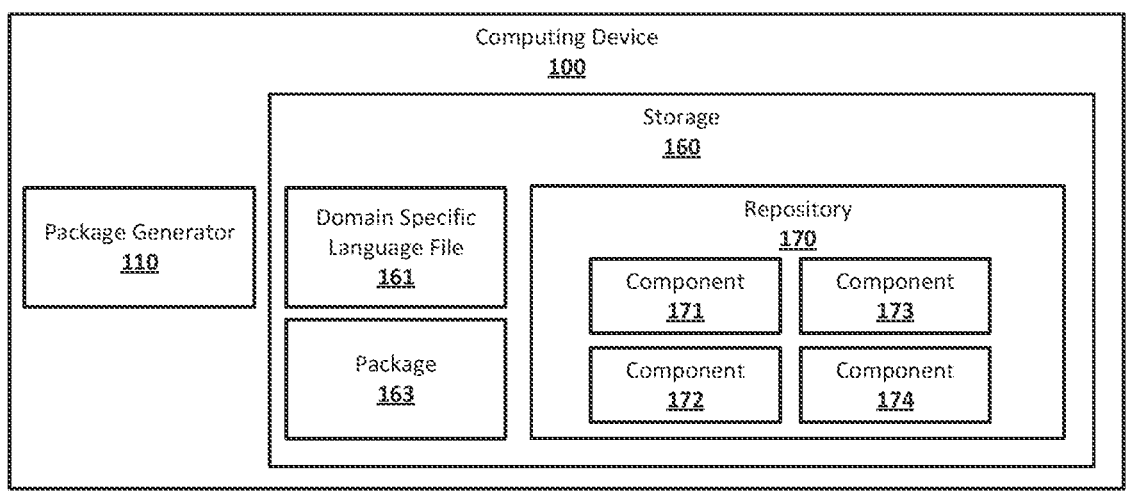
FIG. 1 shows an example system suitable for package generation for configuring a working environment on a server instance according to an implementation of the disclosed subject matter.

Techniques disclosed herein enable package generation for configuring a working environment on a server instance, which may allow for the generation of packages that can be deployed on a server instance of a server system to configure a working environment. A package including environmental metadata, a data module, and workflows including tasks may be received. The package may be deployed on a server instance of a cloud computing server system to configure a working environment. The working environment may be configured with the environmental metadata based on tasks of the workflows. The data module may be deployed to add data to the server instance according to a task of the deployment instructions. Code written using a Domain Specific Language (DSL) for package generation may be received. A first component specified in the code written using the DSL may be determined. A second component may be determined based on a hard reference in code of the first component. A third component may be determined based on soft reference in source code of the first component or the second component. A package including the first component, the second component, and the third component may be generated. The package may be deployed on a cloud computing server system.

A package including environmental metadata, a data module, and deployment instructions including tasks may be received. The package may be a package for configuring a working environment on a server instance of a cloud computing server system. The server instance of the cloud computing server system may include, for example, an application server, a database server, a database, and a search and file system. The cloud computing server system may be a multi-tenant system with any number of server instances, and each server instance may support any number of tenants. Each tenant of a server instance may have their own working environment and data. Each tenant's data may be accessible only to users associated with that tenant and not to users who associated with other tenants of the server instance. All data for all tenants of a server instance may be stored in the database for that server instance. The working environment the package is deployed to configure may be a target working environment for the deployment of the package. The target working environment may already exist on the server instance and may be configured in in accordance with the contents of the deployed package. The target working environment may already have already had some level of configuration performed. For example, the target working environment may have been configured to associate it with a specific tenant of the multi-tenant database system, providing user access control and a basic interface that may be used to allow deployment of packages to configure the working environment. The target working environment may have been further configured through previous deployments of other packages, or through any suitable form of manual configuration.

The environmental metadata included in the package may be metadata for configuring a working environment on a server instance. The environmental data may include components to be used to configure the working environment, including, for example, user interface components, data access components, data analysis components, and API components. The user interface components included in the environmental metadata may be components for user interfaces for the working environment, including interfaces for accessing data in the database, interfaces for analyzing data in the database, interfaces for performing actions with data in the database, and interfaces that provide presentations of data and analysis performed on the data. The data access components included in the environmental metadata may be components that mediate access to the data in the database. The data analysis components included in the environmental metadata may be components that perform analysis on the data in the database. The API components included in the environmental metadata may be components that allow API access to other components of the working environment, including data access components. The user interface components, data access components, data analysis components, and API components included in the environmental metadata may be included in the package in their entirety, for example, including all of the code for the components, or may be included as references to repositories that store the code for the components. The environmental metadata, and components included therein, may determine the look, feel, and functions of the working environment generated by the deploying of the package on the server instance.

The data module included in the package may include any suitable amount of data in any suitable format for being added to the database of the server instance. The data in the data module may belong to the tenant of the cloud computing server system that will use the package to configure the working environment on the server instance of the cloud computing server system. The data may, for example, be in the form of CSV files, external SQL databases, or internal SQL databases. The data module may include the data in its entirety, or may include references to the data which may be stored externally, for example, in an external SQL database, and may be accessible through, for example, API calls during deploying of the package.

The workflows included in the package may be instructions for the deploying of the package on the server instance of the cloud computing server system. The package may include any number of workflows which may each include any number of tasks. The tasks in a workflow may include, for example, tasks for deploying the environmental metadata, transforming the environmental metadata, loading data from the data module of the package into the database of the server instance, removing data from the database of the server instance, and executing scripts included in the package. A task in one workflow may be a separate workflow which has its own tasks. A task may also reference workflows and tasks in other packages, which may allow a package to deploy other packages during its own deployment.

A package may include a workflow for pre-deployment checks. The pre-deployment checks workflows may include tasks that check a target working environment on a server instance to which the package is being deployed, ensuring that all dependency requirements and deployment requirements have been met. Requirements may include, for example, that settings enablement in the target working environment are set as required and additional steps which may be needed for certain metadata types, if present, are enabled. This may allow the package to self-configure and adapt its deployment depending on the current configuration of the target working environment.

A package may include a workflow for deployment. The workflow for deployment may be in a suitable form based on the type of working environment that will be generated by deploying the package. For example, the deployment workflow may include tasks targeted at the generation of a development environment, quality assurance/test environment, or production environment through deployment of the package to configure the working environment on the server instance. A deployment workflow may also be targeted at the deployment of a slimline working environment. The deployment workflow may include tasks that configure the working environment based on the components that are included in the environmental metadata, deploy other packages, and run scripts. The deployment workflow may include tasks for adjusting the configuration of the components in the environmental metadata as necessary based on the configuration and settings that are already part of the working environment.

A package may include a post-deployment workflow. The post-deployment workflow may include tasks that allow additional tasks and workflows to be defined within the working environment after the core deployment workflows in the package have been completed and generated the working environment.

A package may include workflows for data deployment and data generation. The workflow for data deployment may include tasks that may upsert static data from a data module of the package into the database of the server instance, generate data based on a predefined format to be added to the database of the server instance update data in the database of the server instance, or delete data from the database of the server instance. All metadata objects in the working environment may have a unique identifier, or external ID, which may be used to identify different data upserts and allow for the undoing of data loads. Data deployment workflows may include tasks to load data to the database of the server instance of the cloud computing server system from CSV files, external SQL databases or internal SQL Lite databases, or through calls to external APIs.

A package may include a workflow for validation. The workflow for validation may include tasks that may ensure that what was expected to be deployed into the working environment was deployed into the working environment. The tasks in the validation workflows may use a combination of options which may lookup counts of different records, run described queries against objects, use robot frameworks to test click paths in the working environment, and use OCR to determine if components are visible on a given page of the user interface of the working environment.

A package may include a workflow for updating. The workflow for updating may include tasks that may allow for packages to be updated, including updating scripts and libraries within the package. The workflow for updating may allow packages to be updated on demand or by using push updates across multiple packages.

A package may include a workflow for performing health checks. The workflow for performing health checks may include tasks that may allow for a package to check its own configuration and perform repairs if such repairs are needed and can be performed based on the damage to the package. Anything in a package which cannot be repaired automatically may result in a warning or error, depending on severity, being displayed to a user. The workflow for performing health checks may also monitor dependencies that have been added to a package to determine if there is a newer version of any of the dependencies or if any of the currently defined versions of any of the dependencies is out of support, and if so, may notify an appropriate user.

A package may include a workflow for initial setup. The workflow for initial setup may include tasks that may allow multiple settings, files and external services to be set and updated upon the initial setup of the package.

A package may include a workflow for automated testing. The workflow for automated testing may include tasks that may integrate automated test tooling such that may allow a package to be tested on a regular schedule against current and pre-release working environments and may notify an appropriate user of any issues detected in the package. The tasks for automated testing may also run validation tests to ensure that the package can both be deployed to configure a working environment and the expected components and data are then found within the working environment after the deployment of the package.

A package may include a workflow for metadata transformation. The workflow for metadata transformation may include tasks may allow metadata in the package, such as environmental metadata, to be captured and transformed based on details from the working environment, and then loaded to the working environment. The tasks for metadata transformation may ensure that metadata is correct and settings/configuration held within the metadata files, which may, for example, store environmental metadata, are correct for the working environment prior to loading the metadata to configure the working environment.

The package may also include scripts. The scripts included in the package may be scripts in any suitable scripting language that may be run on the server instance. The package may include any number of scripts which may be written using any number of scripting language.

Packages may be configured at any of a number of levels of complexity, which may allow for multiple packages to be more easily combined to configure desired working environments. A level 0 package may be a base layer package that may be used to set up foundational settings, configurations, and data which may be common to most packages. Level O packages may be used to deploy configurations to working environment that other packages may then use.

A level 1 package may be used to deploy an individual package, service or product with default configurations. For example, a level 1 package may include components in its environmental data that configure a working environment with a single product, including, for example, a user interface for the product, a backend for the product, and any other components on which the product may depend.

A level 2 package may add regional configurations and localizations and foundational configurations to level 1 packages. Level 2 packages may include generic configurations for a working environment, which may allow for more specific configurations for multiple use cases to be added to level 2 packages to create higher level packages.

A level 3 package may be used for specific use cases and may use a combination of packages from levels below level 3. For example, a level 3 package may include workflows with tasks that deploy some number of level 0, level 1, and level 2 packages, in any suitable combination.

A level 4 package may be a package that deploys data. For example, a level 4 package may include a data module. Data modules in level 4 packages may be swapped out for data modules with different dataset. For example, a data module that may include a French dataset may be swapped out for a data module that includes an English dataset. A data module that includes data for one use case for an industry may be swapped out for a data module that includes data for a different use case for the same industry, for example, to generate packages useful for setting up working environments that are demonstration environments.

A level 5 package may be a package which may include a stack of other, lower level packages, including level 3 and level 4 packages. Level 5 packages may allow for quicker configuration of working environments A package deployed to configure a working environment on a server instance of a cloud computing server system may be at any level. A package may include other packages which may be stacked from level 0 to level 5, with settings and configurations included in higher level packages in the stack overwriting those of lower level packages in the stack.

Packages may be reused in stacks to create other packages. This may allow packages to be reusable. For example, a package may include a stack of several level 1 packages, which may each configure different components and aspects of a basic working environment. Packages for specific use cases, such as different industries, may be created by adding packages of higher levels to the stack of level 1 packages. The higher-level packages may include use case specific settings, configurations, environmental metadata, and data modules. For example, level 5 packages for use by the health care industry and the finance industry may include the same stack of level 1 packages but may have different higher-level packages. The package for the health care industry may configure a working environment appropriate to that use, while the package for the finance industry may configure a different working environment, even though both packages may include the same stack of level 1 packages.

Each package may also define what features may be needed for the package to be deployed to configure a working environment. Packages may include extensions that may ensure that packages which reference lower level packages include any required features which each of those lower level packages need to ensure that all feature requirements are met for the higher-level packages within the package.

Packages may be structured in any suitable manner. For example, a package may be structured based on a template that includes sections for metadata storage, extensions, data storage, configurations, CLI and API integrations, test automation, and dependency management.

The metadata storage section of a package may include metadata which has been retrieved via APIs and stored in predefined format. The metadata may be, for example, the environmental metadata, including the various components that may be used to configure a working environment.

The extensions sections of a package may include extensions which may interact with anything stored within the package as well as with external APIs and storage. This may allow for the performance of health checks and metadata transformation prior to deployment of the package to configure a working environment on a server instance.

The data storage section of a package may store a data module for the package. The data module may be in the form of a database stored within the package, such as SQLite database files or CSV files, or may be instructions that call external APIs which may provide data or uploaded data from a file, such as a CSV file. The data storage section may also include data shape descriptors which may be used to generate data in a specified format. Generated data may data that does not correlate to anything outside of itself, and may be used, for example, for demonstration purposes or in other situations in which it may not be desirable to use actual data with real-world correlation. For example, customer data may be generated by a package used to configure a working environment for customer relationship management in order to allow for demonstration of or training of people on the working environment without exposing them to actual customer data.

The configuration section of a package may store workflows and their tasks along with other settings such as API versions and registration details. This may allow the other components in other sections of the package to access these elements of the configuration.

The CLI and API integration section of the package may store configurations for integrating with automation platforms.

The test automation section of the package may store rules that may define which tests may be run during test automation.

The dependency management section of the package may store definitions for package dependencies, such as third-party applications and components, which the package may need, and references to other packages, which may allow multiple packages to be joined together. The other packages referenced by a package may be adapted depending on the target working environment or rules set within the configuration or extensions stored in the package. For example, the dependency management of a first package may indicate that a second package should only be used during deployment of the first package if the working environment already has had a third package installed. During deployment of the first package, pre-deployment checks may be used to determine if the third package has been installed in the target working environment. The first package may then only deploy the second package to the target working environment if it is determined that the third package has already been installed in the target working environment. Dependency management may extend outside of an individual package to the external monitoring, which may allow for searching across all available packages at once to determine their dependencies.

To ensure that all packages are deploying correctly packages may be automatically tested on a recurring basis. This may ensure that packages both deploy and that what is deployed by the packages to target working environment is what is expected. Failures may be tracked, and the owners of a package may be notified of such failures. A package may be taken offline for failing too often, for example, failing two consecutive automatic tests, until the package passes testing again following an update to the production or main branch. Packages may also by monitored to ensure that any components stored or referenced within a package are not out of date, updating components and packages as necessary.

Code written using a Domain Specific Language (DSL) for package generation may be received. The DSL for package generation may be a language that may be used, for example, by a user, to specify the components that are desired to be part of a package that may be deployed to configure a working environment on a server instance of a cloud computing system. Specified components may include software components that may configure the look, feel, and functions of the working environment generated by the deploying of the package on the server instance.

A first component specified in the code written using the DSL may be determined. The code written using the DSL may specify components to be part of a package. One of the components specified in the code written using the DSL may be identified during execution of the code written using the DSL. For example, the code written using the DSL may include a line that states: "Given I have a 'DemoAsset' that is a 'LightningComponentBundle' with an 'Id' of 'vplJoinJourneyAgentSessionEnglish'". This line may specify the 'vplJoinJourneyAgentSessionEnglish' component, which may be determined to be a component that should be part of the package generated with the code written using the DSL.

A second component may be determined based on a hard reference in code of the first component. Components specified directly in the code written using the DSL may have dependencies on components that are not specified directly in the code written using the DSL. During interpretation or execution of the code written using the DSL, the code of already determined components may be examined for hard references, which may be direct references within the determined components to the other components on which they are dependent. A hard reference may, for example, directly identify the component dependencies by name or other unique identifiers. For example, the 'vplJoinJourneyAgentSessionEnglish' component may directly state within its own code that it is dependent on a second component that is not directly specified by the code written using the DSL.

A third component may be determined based on soft reference in source code of the first component or the second component. During execution of the code written using the DSL, the code of already determined components may be examined for soft references, which may indirectly specify the other components on which the specified components are dependent. A soft reference may be a reference to a component dependency that may be inferred from a component's code, for example, based on service calls, such as API calls, within the component's code to services that are made available by other components. For example, the 'vplJoinJourneyAgentSessionEnglish' component may include within its code a call to a service that is made available by a third component, thus indicating that it is dependent on that third component that is not directly specified by the code written using the DSL or directly specified in the code of the 'vplJoinJourneyAgentSessionEnglish' component.

A package including the first component, the second component, and the third component may be generated. A package that may be deployed to configure a working environment on a server instance of a cloud computing system may be generated to include the first component, as specified in the code written using the DSL, the second component that was determined based on a hard reference in the code of the first component, and the third component that was determined based on a soft reference in the code of the third component. The package may also include any other components specified in the code written using the DSL and components determined through hard references and soft references in any of the components that are either specified in the code written using the DSL or determined through hard or soft references, ensuring all component dependencies are met within the generated package. The code written using the DSL may also specify data to be included in the package, for example, in a data module, data transformation that may be performed on data included in the package, and pre-scripted actions that may be performed when deploying the package. The package may be in any suitable format and may store components in any suitable manner. For example, software components may be stored in the package as environmental metadata, data may be stored in data modules, and other parts of the package, such as workflows and tasks, extensions, integrations, and test automations may be generated based on the components and data that are part of the package and stored in respective sections of the package. Interpretation or execution of the code written using DSL may result in the generation of a package that may be deployed to configure a working environment on a server instance of a cloud computing server system.

The package may be deployed on a cloud computing server system. Deploying the package on a cloud computing server system may configure a working environment on a server instance of the cloud computing server system. The package may be deployed in accordance with the workflows and tasks stored as part of the package. For example, tasks in the workflows of the package may configure the working environment that is the target of the package deployment with the components in the environmental metadata of the package and load data from a data module of the package into a database of the server instance.

FIG. 1 shows an example system for package generation for configuring a working environment on a server instance according to an implementation of the disclosed subject matter. A computing device 100 may be any suitable computing device, such as, for example, a computer 20 as described in FIG. 9, or component thereof, for package generation for configuring a working environment on a server instance. The computing device 100 may include a package generator 110 and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The package generator 110 may be any suitable combination of hardware and software of the computing device 100 for generating a package from code written in a DSL. The package may be a package that can be deployed to configure a working environment on a server instance of a cloud computing system. The DSL may be a DSL for package generation. The package generator 110 may be a service or application running on the computing device 100 that may generate a package, such as package 163, from a domain specific language file 161. A domain specific language file 161 may include code written in the DSL for package generation that may specify components of the package that will be generated by the package generator 110. The package generator 110 may generate the package 163 from the domain specific language file 161 in any suitable manner. For example, the package generator 110 may be an interpreter for the DSL that may perform operations based on the code in the domain specific language file 161 to generate the package 163, or may be a compiler that may compile the code in the domain specific language file 161 into a binary executable that may be executed to generate the package 163.

The storage 160 may be any suitable combination of hardware and software for storing data. The storage 160 may include any suitable combination of volatile and non-volatile storage hardware and may include components of the computing device 100 and hardware accessible to the computing device 100, for example, through wired and wireless direct or network connections. The storage 160 may store, for example, the domain specific language file 161, the package 163, and a repository 170. The repository 170 may be a repository for software components that may be identified using the code written in the DSL and added into the package 161, such as the components 171, 172, 173, and 174. The components 171, 172, 173, and 174 may be any suitable software components that may be used in the configuration of a working environment on a server instance, including, for example, user interface components, data access components, data analysis components, and API components.

Figure 2:
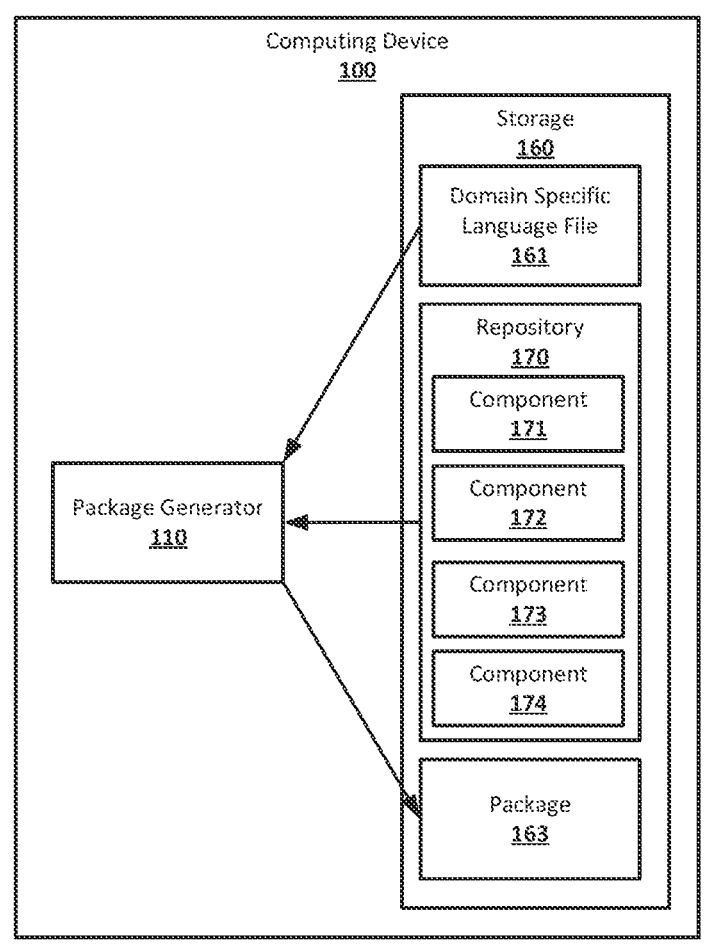
FIG. 2 shows an example arrangement suitable for package generation for configuring a working environment on a server instance according to an implementation of the disclosed subject matter.

FIG. 2 shows an example arrangement suitable for package generation for configuring a working environment on a server instance according to an implementation of the disclosed subject matter. The domain specific language file 161 may be stored in the storage 160 of the computing device 100. The domain specific language file 161 may have been generated in any suitable manner by any suitable party, including, for example, a user of the computing device 100 or other computing device, and may be generated on the computing device 100 or received at the computing device 100 from any suitable source.

The package generator 110 may generate the package 163 from the domain specific language file 161. The package 163 may be generated to be deployable to configure a working environment on a server instance of a cloud computing server system. The package generator 110 may generate the package 163 by determining which components are directly specified within the code written in DSL in the domain specific language file 161, which components are specified by hard references in the code of the directly specified components or other components determined through hard or soft references, and which components are identifiable through soft references in the code of the directly specified components or components determined through hard or soft references. The package generator 110 may add all of the determined components to the package 163, for example, by retrieving the components from the repository 170 on the computing device 100 or any other suitable repository stored in any suitable storage device accessed through any suitable computing device. This may result in the components of the package 163 having all their dependencies met within the package 163. The package generator 110 may also add any other suitable items to the package 163, including, for example, data, data transformations, pre-scripted actions, workflows and tasks, extensions, integrations, and test automations, which may be specified in the code written using DSL in the domain specific language 161 or may be generated based on, for example, the components added to the package 163. For example, the package generator 110 may generate workflows and tasks for the package 163 based in part on an order in which the components included in the package 163 need to be deployed to a working environment to allow them to function properly, for example, based on a dependency tree for the components, included components in other packages included in the package.

FIG. 3A shows an example arrangement suitable for package generation for configuring a working environment on a server instance according to an implementation of the disclosed subject matter. The package generator 110 receive the domain specific language file 161 and determine a component specified directly in the domain specific language file 161. The package generator 110 may determine that a component having an ID of "vplJoinJourneyAgent-SessionEnglis" is directly specified in the code of the domain specific language file 161. The package generator 110 may then check the repository 170 to locate the component that has the ID "vplJoinJourneyAgentSessionEnglis", which may be, for example, the component 171. The package generator 110 may add the component 171, with an ID that matches the ID directly specified in the code of the domain specific language filed 161, to the package 163.

Figure 3B:
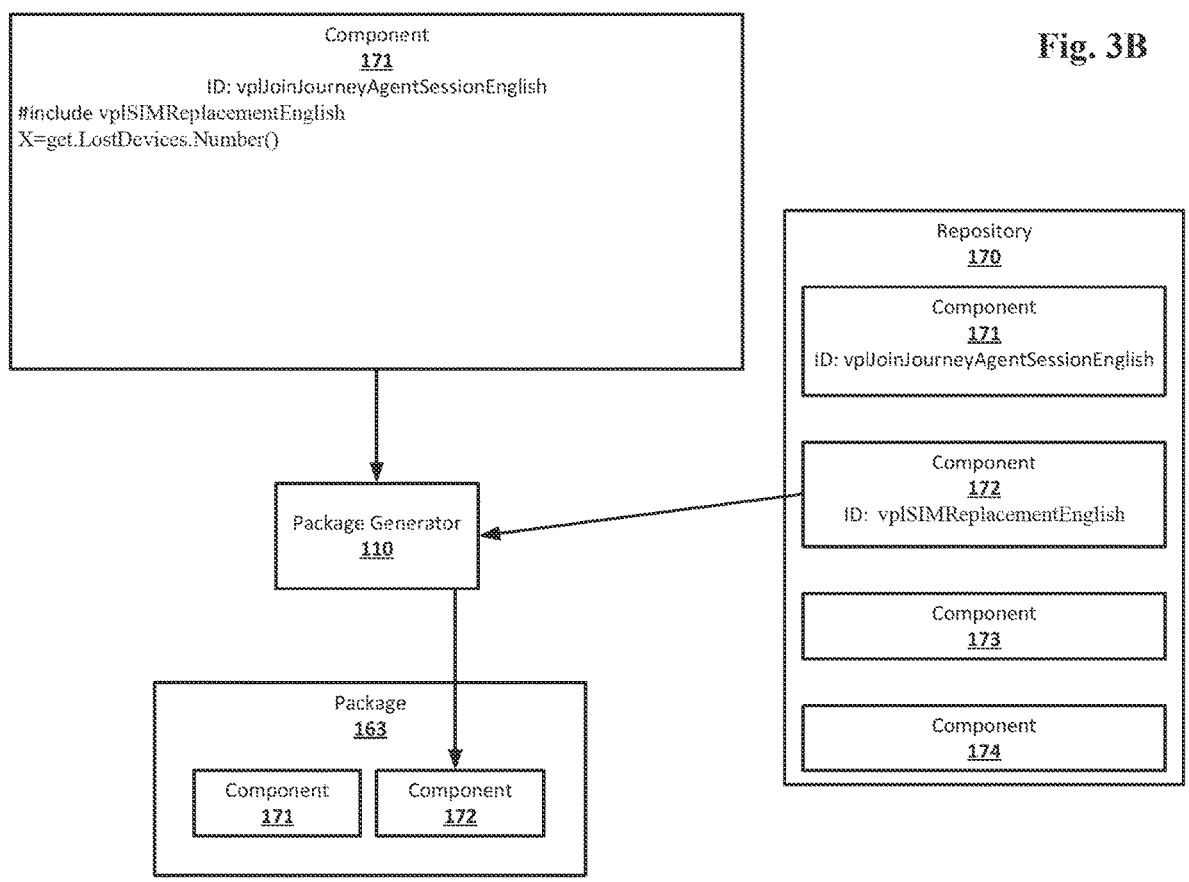
FIG. 3B shows an example arrangement suitable for package generation for configuring a working environment on a server instance according to an implementation of the disclosed subject matter.

FIG. 3B shows an example arrangement suitable for package generation for configuring a working environment on a server instance according to an implementation of the disclosed subject matter. The package generator 110 examine the code of the component 171, which was directly specified in the code of the domain specific language file 161, for hard references to other components. The package generator may, for example, determine that the code of the component 171 includes a hard reference to a component with an ID of "vplSIMReplacementEnglish", indicating that the component 171 is dependent on the component with that ID. The package generator 110 may then check the repository 170 to locate the component that has the ID "vplSIMReplacementEnglish", which may be, for example, the component 172. The package generator 110 may add the component 172, with an ID that matches the ID from the hard reference in the code of the component 171, to the package 163.

Figure 3C:
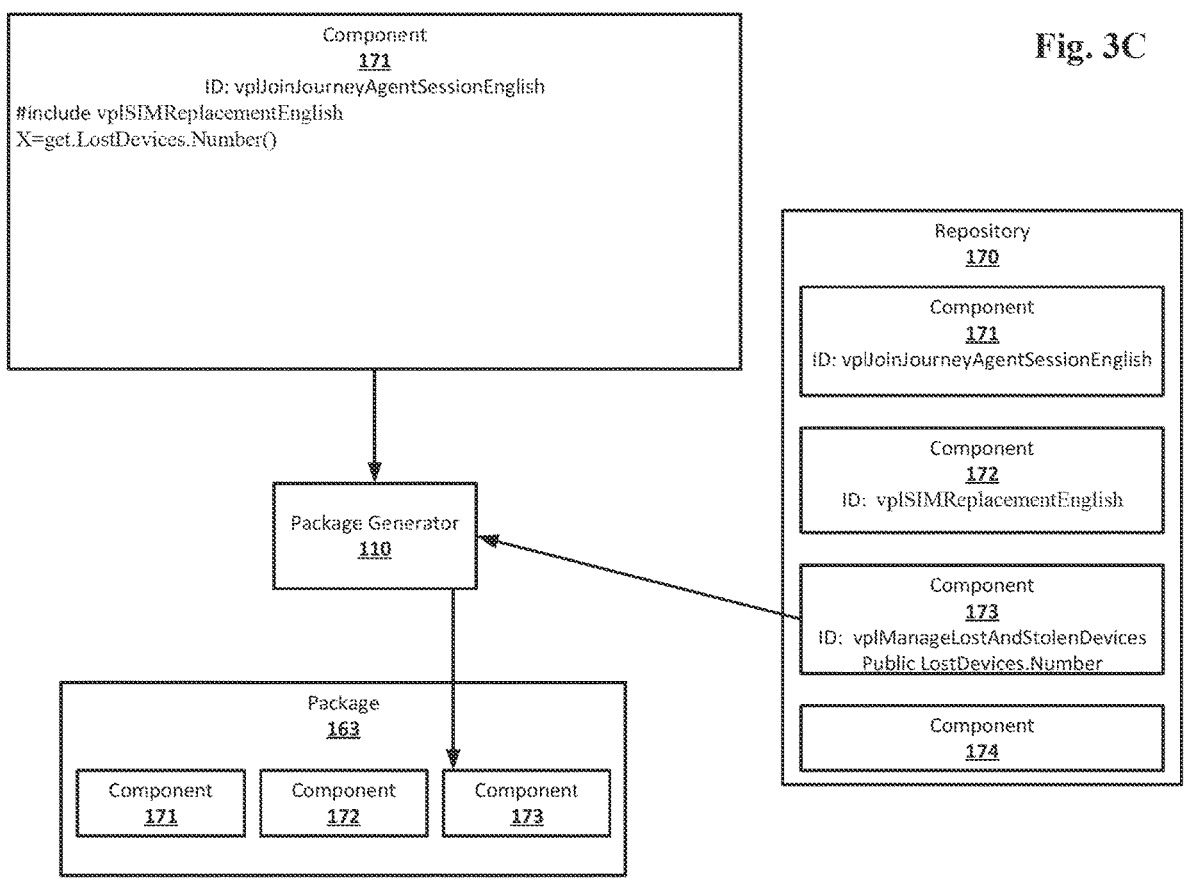
FIG. 3C shows an example arrangement suitable for package generation for configuring a working environment on a server instance according to an implementation of the disclosed subject matter.

FIG. 3C shows an example arrangement suitable for package generation for configuring a working environment on a server instance according to an implementation of the disclosed subject matter. The package generator 110 examine the code of the component 171, which was directly specified in the code of the domain specific language file 161, for soft references to other components. The package generator may, for example, determine that the code of the component 171 uses a call to "LostDevices.Number", which may be an API call into a component that is not the component 171, indicating that the component 171 is dependent on the component into which the API calls. The package generator 171 may determine that the API calls into a component with an ID of "vplManageLostAndStolenDevices", indicating that the component 171 is dependent on the component with that ID. The package generator 110 may determine the component ID of that corresponds to the call in the code of the component 171 in any suitable manner. For example, the package generator 171 may have access to a list of available components and their constituent callable APIs and procedures, or may examine the code of the available components to determine which component includes the API or procedure that matches the call in the code of the component 171. After the package generator 110 has determined the component that has the API or procedure called in the code of the component 171, for example, the component 173 in the repository 170, the package generator 110 may add the component 173 to the package 163.

Figure 4:
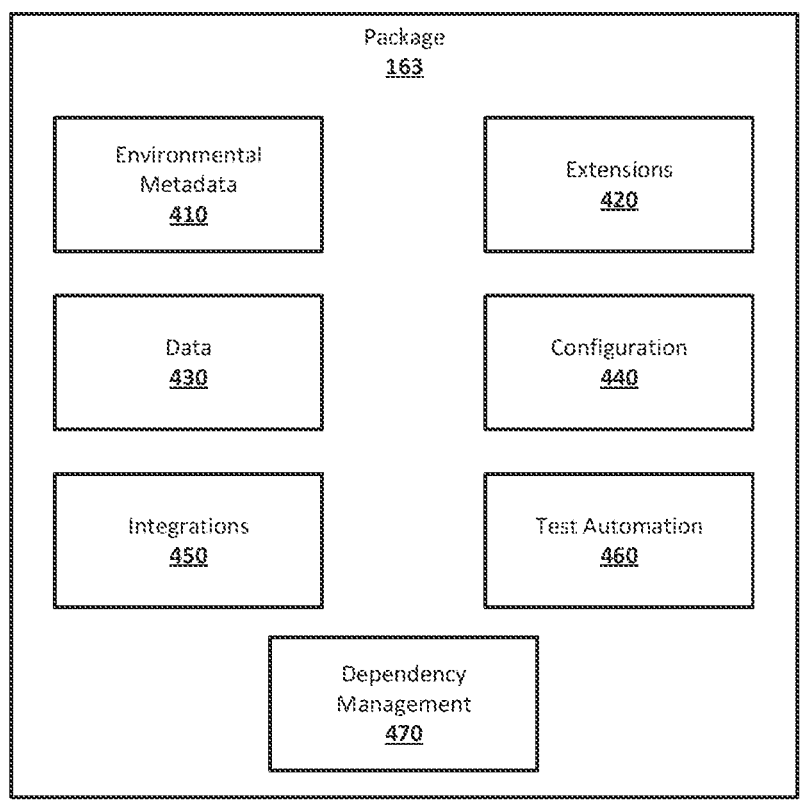
FIG. 4 shows an example arrangement suitable for package generation for configuring a working environment on a server instance according to an implementation of the disclosed subject matter.

FIG. 4 shows an example arrangement suitable for package generation for configuring a working environment on a server instance according to an implementation of the disclosed subject matter. The package 163, which may be generated by the package generator 110 or in any other suitable manner, may include environmental metadata 410, extensions 420, data 430, configuration 440, integrations 450, test automation 460, and dependency management 470.

The environmental metadata 410 may be metadata for configuring a working environment on a server instance of a cloud computing server system. The environmental metadata 410 may, for example, include software components that will be part of the configuration of the working environment, such as, for example, any of the components 171, 172, 173, and 174.

The extension 420 may include extensions which may interact with anything stored within the package 163 as well as with external APIs and storage. This may allow for the performance of health checks and metadata transformation prior to deployment of the package 164 to configure a working environment on a server instance.

The data 430 may store a data module for the package 163. The data module may be in the form of a database stored within the package, such as SQLite database files or CSV files, or may be instructions that call external APIs which may provide data or uploaded data from a file, such as a CSV file. The data storage section may also data shape descriptors which may be used to generate data in a specified format. Generated data may data that does not correlate to anything outside of itself, and may be used, for example, for demonstration purposes or in other situations in which it may not be desirable to use actual data with real-world correlation. For example, customer data may be generated by a package used to configure a working environment for customer relationship management in order to allow for demonstration of or training of people on the working environment without exposing them to actual customer data.

The configuration 440 may include workflows and their tasks along with other settings such as API versions and registration details. This may allow the other components in other sections of the package 163 to access these elements of the configuration.

The integrations 450 may include CLI and API integrations, which may be configurations for integrating with automation platforms.

The test automation 460 may include rules that may define which tests may be run during test automation.

The dependency management 470 may include definitions for package dependencies, such as third-party applications and components, which the package 163 may need, and references to other packages, which may allow multiple packages to be joined together. The other packages referenced by the package 163 may be adapted depending on the target working environment or rules set within the configuration or extensions stored in the package 163.

The package 163 may, for example, be a level 4 or level 5 package that may be used to configure a working environment with both environmental metadata and data.

Figure 5A:
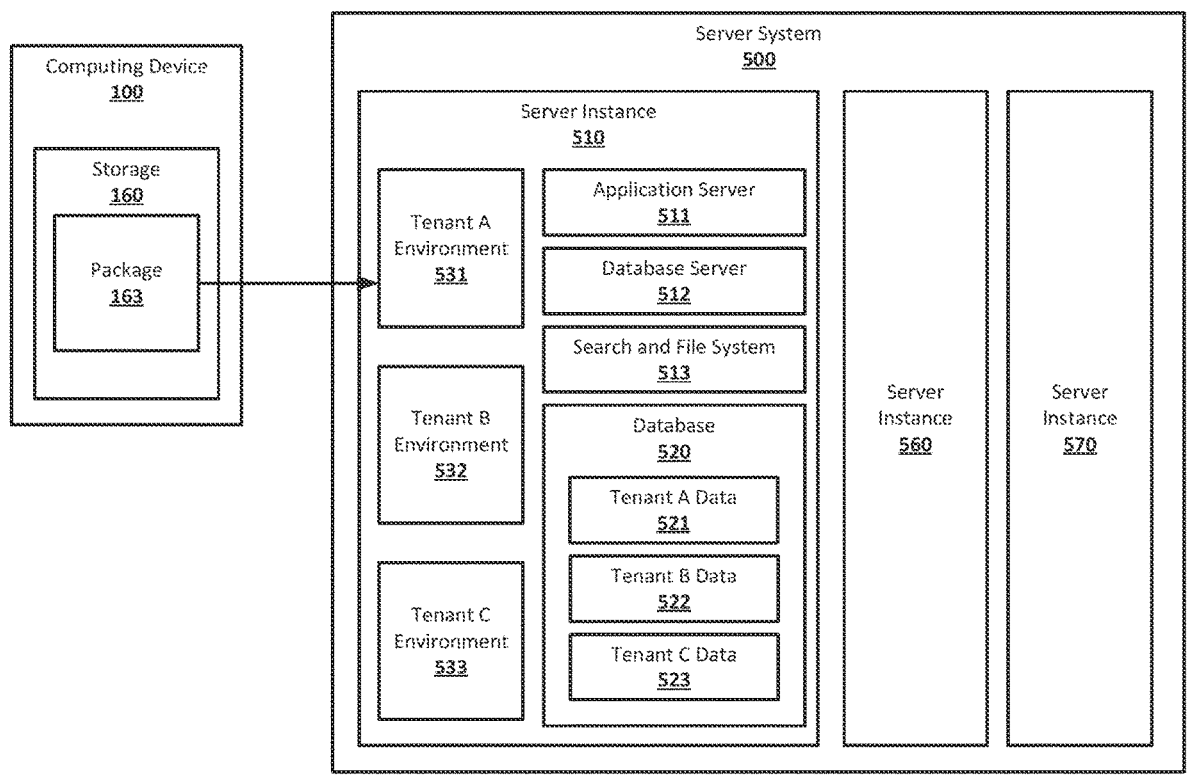
FIG. 5A shows an example arrangement suitable for package generation for configuring a working environment on a server instance according to an implementation of the disclosed subject matter.

FIG. 5A shows an example arrangement suitable for package generation for configuring a working environment on a server instance according to an implementation of the disclosed subject matter. The package 163 may be deployed to configure a working environment on a server instance of a cloud computing server system. A server system 500 may be, for example, a cloud computing server system that may include computing devices that may be, for example, the computer 20 as described in FIG. 9, or components thereof. The server system 500 may include any number computing devices, each of which may include any suitable combination of central processing units (CPUs), graphical processing units (GPUs), and tensor processing units (TPUs). The server system 500 may be distributed over any geographic area, and may, for example, include geographically disparate computing devices connected through any suitable network connections.

The server system 500 may include server instances 510, 560, and 570. The server instances 510, 560, and 570 may be divisions of the computational resources of the server system 500 which may operate with some level of independence within the server system 500. Each of the server instances 510, 560, and 570 may include its own separate application server, database server, search and file system, and database. For example, the server instance 510 may include an application server 511, database server 512, search and file system 513, and database 520, which operate as part of the server instance 510 and may not be usable by the server instances 560 and 570.

The database 520 of the server instance 510 may use any suitable physical storage of the server system 500. The database 520 may store data for tenants of the server instance 510, for example tenant A data 521, tenant B data 522, and tenant C data 523. The tenant data stored in the database 520 may be kept separate through controlling tenant data access to data.

The server instance 510 may also include working environments for the tenants of the server instance 510. For example, the server instance 510 may include tenant A environment 531, tenant B environment 532, and tenant C environment 533. The working environment for a tenant an on the server instance 510 may be used by users associated with the tenant to access and interact with the tenant's data in the database 520 through the database server 512 and applications served by the application server 511.

The package 163 may be deployed to the server instance 510 to configure a working environment for a tenant, including adding, modifying, or removing data for that tenant from the database 520. The working environment configured by the package 163 may already have any suitable configuration. For example, when a tenant is initially added to the server instance 510, the working environment for the tenant may initially have a default configuration and the tenant may have no data stored in the database 520. The package 163 may be deployed to the server instance 510 to perform configuration beyond any initial configuration. The working environment may have already had additional configuration performed on it, for example, through previous deployment of packages, and deployment of the package 163 may perform further configuration of the working environment. The package 163 may, for example, be deployed to configure the tenant A environment 531, which may be the target working environment for the package 163.

Figure 5B:
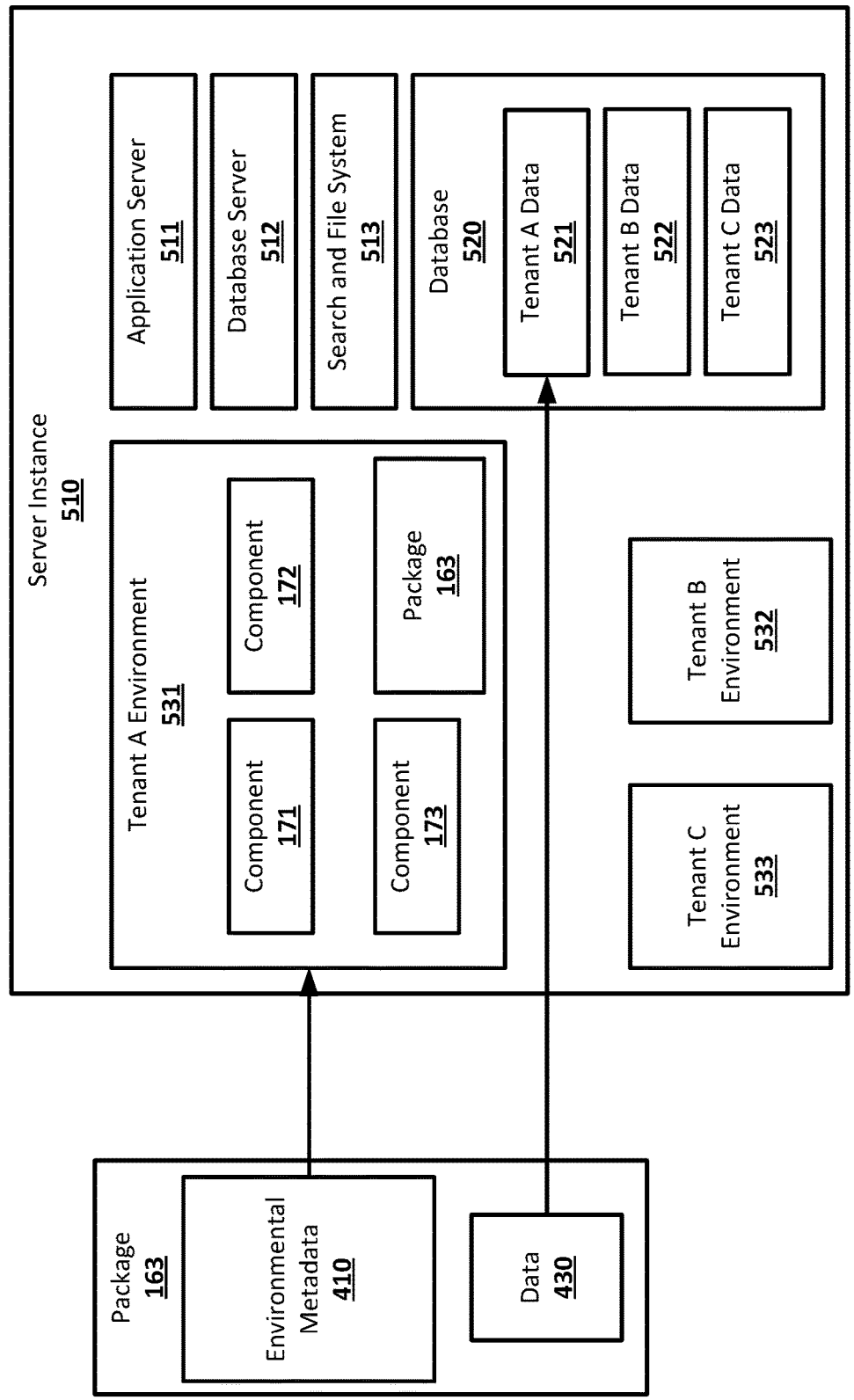
FIG. 5B shows an example arrangement suitable for package generation for configuring a working environment on a server instance according to an implementation of the disclosed subject matter.

FIG. 5B shows an example arrangement suitable for package generation for configuring a working environment on a server instance according to an implementation of the disclosed subject matter. During deployment of the package 163 to the tenant A environment 531 on the server instance 510, the workflows and their tasks in the configuration 440 of the package 163 may be executed, for example, on the server instance 510 or on the computing device 100. Any pre-deployment checks included in the workflows of the package 163 may be performed, after which deployments workflows may be executed to deploy the package 163.

The deployment workflows may include tasks that configure the tenant A environment 531 with components in the environmental metadata 410, for example, the components 171, 172, and 173, after the performance of any pre-deployment checks. These components may include, for example, user interface components, data access components, data analysis components, and API components that may be configured within the tenant A environment 531 to provide a working environment that users of the tenant A environment 531 may use to work with the tenant A data 521. Configuring the tenant A environment 531 with components in the environmental metadata 410 may include performing checks on any components that are already part of the tenant A environment 531, whether they were deployed using other packages or otherwise added, and adjusting the configuration of the components in the environmental metadata 410 as necessary based on the configuration and settings that are already part of the tenant A environment 531. The workflows in the configuration 440 of the package 163 may also include tasks that reference other packages. These referenced packages may also be deployed to configure the tenant A environment 531 in accordance with the workflows and tasks in the configuration 440.

The deployment workflows may include task that add, remove, or modify data in the tenant A data 521 in the database 520. For example, the data 430 of the package 163 may include a data module, references to external data sources, or data shape descriptors for generating data, that include or generate data to be added to the tenant A data 521. The workflows may also include tasks that perform transformation on this data.

After configuration of the tenant A environment 531 and addition of data to the tenant A data 521, any post-deployment checks and test automations included in the tasks of the workflows in the configuration 440 may be performed. The package 163 may be stored as part tenant A environment 531 to allow for future updates of the tenant A environment 531 based on updates to the package 163.

The use of the package 163 may allow for the configuration of the tenant A environment 531 with minimal user interaction and may require minimal technical knowledge from the user deploying the package 163.

Figure 6:
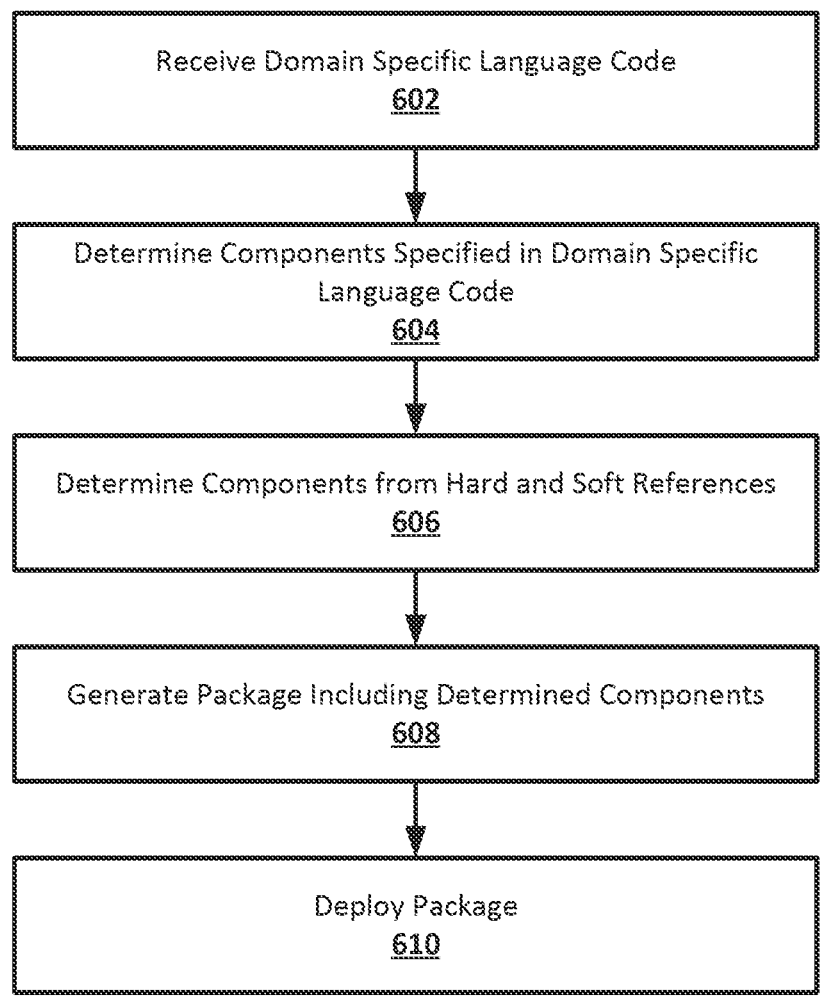
FIG. 6 shows an example procedure suitable for package generation for configuring a working environment on a server instance according to an implementation of the disclosed subject matter.

FIG. 6 shows an example procedure suitable for package generation for configuring a working environment on a server instance according to an implementation of the disclosed subject matter. At 602, code written in a domain specific language may be received. For example, the domain specific language file 161 may be received at the package generator 110 of computing device 100. The domain specific language file 161 may have been generated on the computing device 100, for example, by a user, or may be received from an external computing device. The domain specific language file 161 may include code written using a DSL for package generation. The code may specify components to be included in a package, such as the package 163, for configuring a working environment on a server instance of a cloud computing server system.

At 604, components specified in the code written in the domain specific language may be determined. For example, the package generator 110 may interpret the code in the domain specific language file 161 to generate a package such as the package 163. The package generator 110 may determine which components are directly specified in the code in the domain specific language file 161. For example, the package generator 110 may determine that the component 171 is directly specified in the code in the domain specific language file 161 based on the presence of the ID for the component 171 in the code in conjunction with code indicating that the component with that ID should be included in the generated package. The code in the domain specific language file 161 may specify any number of components, and the package generator 110 may determine every component that is specified in the code.

At 606, components may be determined from hard references and soft references. For example, the package generator 110 may determine components to be included in the package 163 based on hard references and soft references in the code of components already determined by the package generator 110 to be included in the package 163. The components already determined to be included in the package 163 may include in their code direct references to other components, indicating dependency on those other components. For example, the code of the component 171 may directly specify that it is dependent on the component 172. The component 172 may be specified in the code of the component 171 in any suitable manner, for example, by a direct identifier such as a component name. This may be a hard reference from which the package generator 110 may determine that the component 172 should be included in the package 163. The components already determined to be included in the package 163 may include in their code indirect references to other components, indicating dependency on those other components. For example, the code of the component 171 may indirectly specify that it is dependent on the component 173. The component 173 may be indirectly specified in any suitable manner that is not a direct specification. For example, the indirect specification may be made through an API call or other procedure call in the code of the component 171. This may be a soft reference from which the package generator 110 may determine that the component 173 should be included in the package 163. The package generator 110 may determine the component that is the subject of a soft reference in any suitable manner. For example, the package generator 110 may have access to a list of APIs or procedures that are available in all available components, including those in the repository 170 and elsewhere, and may determine which component include the API or procedure that is included in the code of the component being examined by the package generator 110. The package generator 110 may check all components to be included in the package 163 for hard and soft references, including components determined to be included in the package 163 through hard or soft references in other components.

At 610, a package that includes the determined components may be generated. For example, the package generator 110 may generate the package 163 to include the components 171, 172, and 173, and any other components determined through direct specification in the code in the domain specific language file 161 or through hard or soft references. The components may be included in the environmental metadata 410 of the package 163. The components may be added to the package 163 on a component-level basis or may be added by adding in other packages which already include the components, for example, lower-level packages. The package generator 110 may add any other elements specified in the code in the domain specific language file 161 to the package 163, including, for example, the data 430. The package generator 110 may also generate workflows and tasks to be used during the deployment of the package 163. The package generator 110 may generate the workflows and tasks to configure the target working environment, for example, the tenant A environment 531, with the components from the environmental metadata 410 by deploying the components in an order that allows the components to function properly. The order may be based on a dependency tree for the components in the package 163, including components in other packages included within the package 163 The package 163, after being generated by the package generator 110, may be stored in any suitable storage, including, for example, the storage 160 of the computing device 100.

Figure 7:
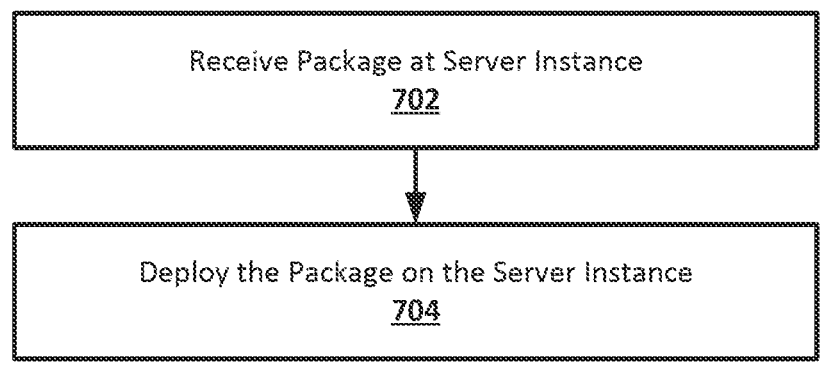
FIG. 7 shows an example procedure suitable for package generation for configuring a working environment on a server instance according to an implementation of the disclosed subject matter.

FIG. 7 shows an example procedure suitable for package generation for configuring a working environment on a server instance according to an implementation of the disclosed subject matter. At 702, a package may be received. For example, the package 163 may be received at the server instance 510 of the server system 500 to be deployed with a target of the tenant A environment 531 The package 163 may be received at the server instance 510 from any suitable source, including, for example, from the computing device 100. A user of the tenant A environment 510 may, for example, select to deploy the package 163 to configure the tenant A environment 510, causing the package 163 to be received at the server instance 510.

At 704, the package may be deployed on the server instance. For example, the package 163 may be deployed on the server instance 510, configuring the tenant A environment 531 with the environmental metadata 410 and adding, modifying, or removing data in the tenant A data 521 based on the data 430. The deployment of the package 163 may be run based on the workflows and their constituent tasks in the configuration 440. This may include the running of any workflows for pre-deployment checks, deployment of the environmental metadata 410, post-deployment workflows, data deployment and data generation, validation, automated testing, and metadata transformation. Deployment of the package 163 may also include running of any scrips included in the package 163, in accordance with tasks in the workflows in the configuration 440.

Figure 8:
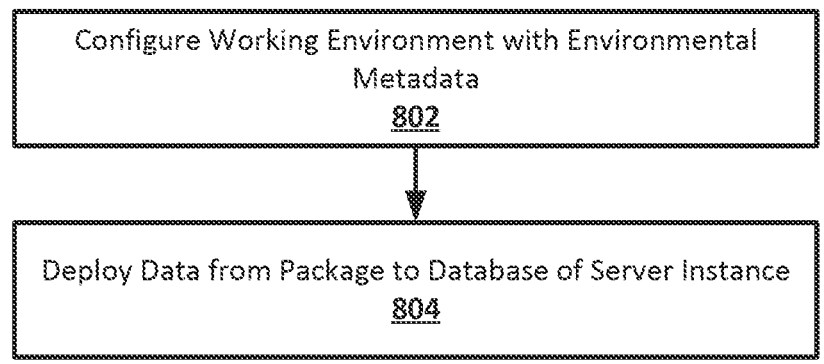
FIG. 8 shows an example procedure suitable for package generation for configuring a working environment on a server instance according to an implementation of the disclosed subject matter.

FIG. 8 shows an example procedure suitable for package generation for configuring a working environment on a server instance according to an implementation of the disclosed subject matter. At 802, working environment may be configured with environmental metadata. For example, during deployment of the package 163, workflows in the configuration 440 including tasks for configuration of the target working environment, for example, the tenant A environment 531, using the environmental metadata 410, may be run. Configuring the tenant A environment 531 with the environmental metadata 410 may include configuring the tenant A environment 531 with the components, for example, the components 171, 172, and 173, from the environmental metadata 410. This may include, for example, installing the components 171, 172, and 173 to the target A environment 531 so that they may run on the server instance 510 and be accessible to the users of the tenant A environment 531.

At 804, data from the package may be deployed to the database of the server instance. For example, during deployment of the package 163, workflows in the configuration 440 including tasks for deployment of the data 440 to the database 520, for example, to the tenant A data 521. The data 440 may include any suitable combination of data modules, references to external data sources, and instructions for generating data. The data 440 may be deployed by adding data to the tenant A data 521, modifying data in the tenant A data 521, and/or removing data from the tenant A data 521 in accordance with the contents of the data 440. For example, if the data 440 includes a single data module, the data from the single data module may be added to the tenant A data 521, making it accessible through the tenant A environment 531 and the database server 512.

Figure 9:
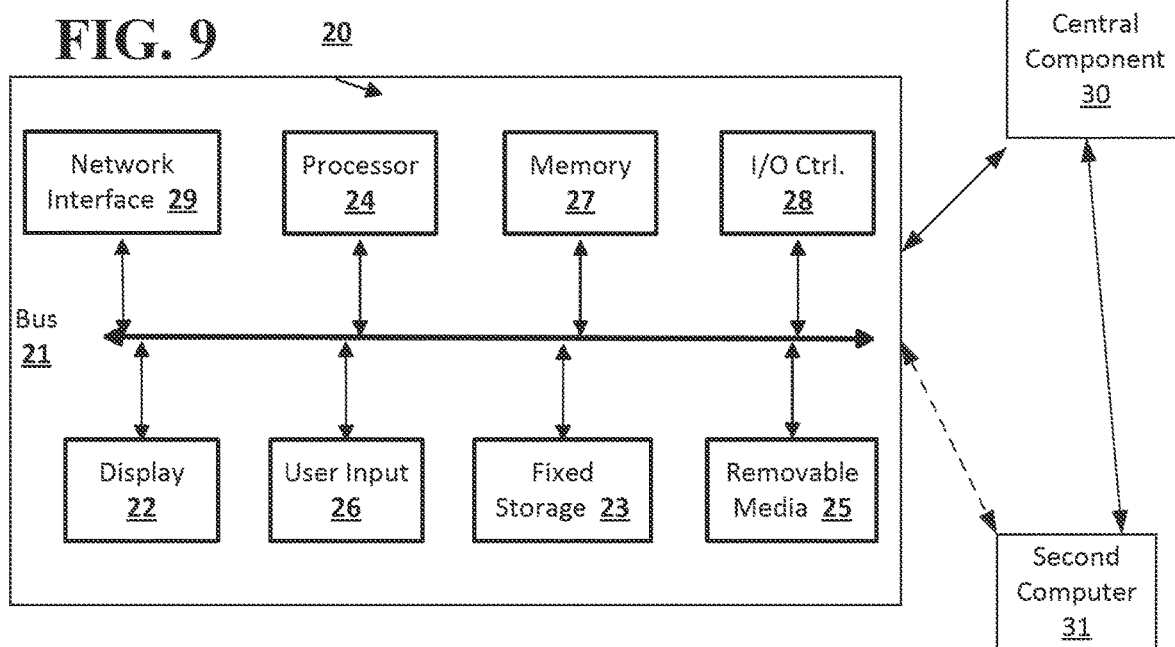
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touch-screen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
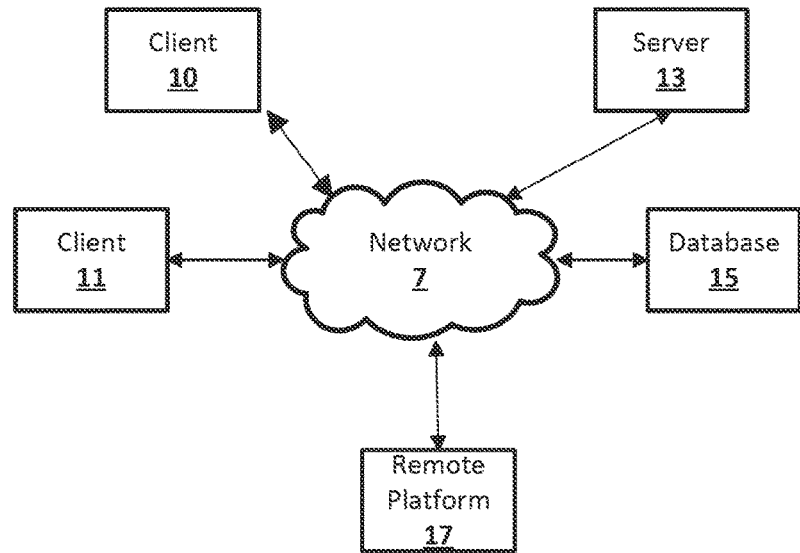
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving, at a computing device, code written using a Domain Specific Language (DSL) for package generation;
determining, by the computing device, a first component specified in the code written using the DSL;
determining, by the computing device, a second component based on a hard reference in code of the first component;
determining, by the computing device, a third component based on soft reference in source code of the first component or the second component, wherein the soft reference comprises a call to a service of the third component in code of the first component;
generating, by the computing device, a package comprising at least the first component, the second component, and the third component; and
deploying, by the computing device, the package on a server instance of a cloud computing server system.

2. The computer-implemented method of claim 1, wherein generating the package further comprises:
determining an order for configuring a working environment with the first component, second component, and third component based on a dependency tree;
generating one or more workflows, each comprising one or more tasks, based on the determined order; and
storing the one or more workflows in the package.

3. The computer-implemented method of claim 2, wherein deploying the package on the server instance of the cloud computing server system further comprises:
configuring a target working environment on a server instance of a cloud computing server system with the first component, second component, and third component on a target area using the one or more workflows generated based on the determined order.

4. The computer-implemented method of claim 1, wherein generating the package further comprises:
storing a data module in the package; and
generating a workflow comprising one or more tasks for deploying the data module to a database of the server instance of the cloud computing server system.

5. The computer-implemented method of claim 4, wherein deploying the package on the server instance of the cloud computing server system further comprises:
deploying the data module to the database of the server instance of the cloud computing server system using the workflow that comprises one or more tasks for deploying the data module.

6. The computer-implemented method of claim 1, wherein the hard reference comprises a direct specification of the second component in the code of the first component.

7. The computer-implemented method of claim 1, wherein the soft reference comprises a service call in the code of the first component to a service made available by the third component.

8. A computer-implemented system comprising:
a storage; and
a processor that receives code written using a Domain Specific Language (DSL) for package generation,
determines a first component specified in the code written using the DSL,
determines a second component based on a hard reference in code of the first component,
determines a third component based on soft reference in source code of the first component or the second component, wherein the soft reference comprises a call to a service of the third component in code of the first component,
generates a package comprising at least the first component, the second component, and the third component, and
deploys the package on a server instance of a cloud computing server system.

9. The computer-implemented system of claim 8, wherein the processor generates the package by determining an order for configuring a working environment with the first component, second component, and third component based on a dependency tree,
generating one or more workflows, each comprising one or more tasks, based on the determined order, and
storing the one or more workflows in the package.

10. The computer-implemented system of claim 9, wherein the processor deploys the package on the server instance of the cloud computing server system by configuring a target working environment on a server instance of a cloud computing server system with the first component, second component, and third component on a target area using the one or more workflows generated based on the determined order.

11. The computer-implemented system of claim 8 wherein the processor generates the package by further storing a data module in the package and
generating a workflow comprising one or more tasks for deploying the data module to a database of the server instance of the cloud computing server system.

12. The computer-implemented system of claim 11, wherein the processor deploys the package on the server instance of the cloud computing server system by deploying the data module to the database of the server instance of the cloud computing server system using the workflow that comprises one or more tasks for deploying the data module.

13. The computer-implemented system of claim 8, wherein the hard reference comprises a direct specification of the second component in the code of the first component.

14. The computer-implemented system of claim 8, wherein the soft reference comprises a service call in the code of the first component to a service made available by the third component.

15. A system comprising: one or more computers and one or more non-transitory storage devices storing instructions which are operable, when executed by the one or more computers, to cause the one or more computers to perform operations comprising:
receiving, at a computing device, code written using a Domain Specific Language (DSL) for package generation;
determining, by the computing device, a first component specified in the code written using the DSL;
determining, by the computing device, a second component based on a hard reference in code of the first component;
determining, by the computing device, a third component based on soft reference in source code of the first component or the second component, wherein the soft reference comprises a call to a service of the third component in code of the first component;

generating, by the computing device, a package comprising at least the first component, the second component, and the third component; and deploying, by the computing device, the package on a server instance of a cloud computing server system.

16. The system of claim 15, wherein the one or more computers and one or more non-transitory storage devices further store instructions which are operable, when executed by the one or more computers, to cause the one or more computers to perform the operation of generating the package further cause the one or more computers to perform operations comprising:

determining an order for configuring a working environment with the first component, second component, and third component based on a dependency tree;

generating one or more workflows, each comprising one or more tasks, based on the determined order; and storing the one or more workflows in the package.

17. The system of claim 16, wherein the one or more computers and one or more non-transitory storage devices further store instructions which are operable, when executed by the one or more computers, to cause the one or more computers to perform the operation of deploying the package on the server instance of the cloud computing further cause the one or more computers to perform operations comprising:

configuring a target working environment on a server instance of a cloud computing server system with the first component, second component, and third component on a target area using the one or more workflows generated based on the determined order.

18. The system of claim 15, wherein the one or more computers and one or more non-transitory storage devices further store instructions which are operable, when executed by the one or more computers, to cause the one or more computers to perform the operation of generating the package further cause the one or more computers to perform operations comprising:

storing a data module in the package; and generating a workflow comprising one or more tasks for deploying the data module to a database of the server instance of the cloud computing server system.

19. The system of claim 18, wherein the one or more computers and one or more non-transitory storage devices further store instructions which are operable, when executed by the one or more computers, to cause the one or more computers to perform the operation of deploying the package on the server instance of the cloud computing further cause the one or more computers to perform operations comprising:

deploying the data module to the database of the server instance of the cloud computing server system using the workflow that comprises one or more tasks for deploying the data module.

20. The system of claim 15, wherein the hard reference comprises a direct specification of the second component in the code of the first component, and wherein the soft reference comprises a service call in the code of the first component to a service made available by the third component.

* * * * *